United States Patent
Maynard (10) Patent No.: US 12,502,230 B2
(45) Date of Patent: Dec. 23, 2025

(54) INVENTORY SYSTEMS AND METHODS FOR RETAINED SURGICAL ITEM DETECTION

(71) Applicant: Covidien LP, Mansfield, MA (US)

(72) Inventor: Edwin M. Maynard, Frederick, CO (US)

(73) Assignee: Covidien LP, Mansfield, MA (US)

( * ) Notice: Subject to any disclaimer, the term of this patent is extended or adjusted under 35 U.S.C. 154(b) by 75 days.

(21) Appl. No.: 18/532,017

(22) Filed: Dec. 7, 2023

(65) Prior Publication Data

US 2024/0238047 A1    Jul. 18, 2024

Related U.S. Application Data (60) Provisional application No. 63/439,614, filed on Jan. 18, 2023.

(51) Int. Cl.
| | |
|---|---|
| *A61B 34/20* | (2016.01) |
| *A61B 90/98* | (2016.01) |
| *G06K 7/10* | (2006.01) |
| *G16H 40/20* | (2018.01) |

(52) U.S. Cl.
CPC ............. *A61B 34/20* (2016.02); *A61B 90/98* (2016.02); *G06K 7/10475* (2013.01); *G16H 40/20* (2018.01); *A61B 2034/2072* (2016.02)

(58) Field of Classification Search
CPC . A61B 34/20; A61B 2034/2072; A61B 90/98; G16H 40/20; G06K 7/10475
See application file for complete search history.

(56) References Cited

U.S. PATENT DOCUMENTS

| | | | |
|---|---|---|---|
| 7,298,264 B1 | 11/2007 | Kuzma et al. | |
| 8,279,112 B2 | 10/2012 | Carrick | |
| 9,443,407 B2 | 9/2016 | Davidson | |
| 11,408,965 B2 | 8/2022 | Hewett et al. | |
| 2004/0250819 A1 | 12/2004 | Blair et al. | |
| 2006/0244593 A1* | 11/2006 | Nycz ................... | G01D 5/2291 340/572.1 |
| 2007/0268133 A1 | 11/2007 | Sanchez et al. | |

(Continued)

OTHER PUBLICATIONS

Extended European Search Report issued in corresponding European Application No. 24152329.9 dated Jun. 24, 2024, 10 pages.

*Primary Examiner* — Chao Sheng
(74) *Attorney, Agent, or Firm* — Carter, DeLuca & Farrell LLP (57) ABSTRACT

An inventory system configured for detecting and counting surgical items includes an RFID tag affixed to a surgical item, a plurality of RFID transceivers, a processor, and a memory. The memory includes instructions stored in the memory, which when executed by the processor cause the system to: energize the RFID tag; receive a first return signal from the RFID tag by the plurality of RFID transceivers; determine an initial position of the surgical item; receive a second return signal from the RFID tag by the plurality of RFID transceivers; determine a last known position of the surgical item and a velocity of the RFID tag; determine a difference between the last known position of the RFID tag and the initial position of the RFID tag; and determine a count of the surgical item based on the determined difference and the velocity and/or direction of the RFID tag.

20 Claims, 4 Drawing Sheets

(56) References Cited

U.S. PATENT DOCUMENTS

| | | |
|---|---|---|
| 2016/0157957 A1 | 6/2016 | Blair |
| 2018/0338801 A1 | 11/2018 | Barnett et al. |
| 2019/0298484 A1 | 10/2019 | Aquino et al. |
| 2020/0395118 A1 | 12/2020 | Codd et al. |
| 2021/0407659 A1 | 12/2021 | Ho |

* cited by examiner

INVENTORY SYSTEMS AND METHODS FOR RETAINED SURGICAL ITEM DETECTION

CROSS-REFERENCE TO RELATED APPLICATIONS

This application claims the benefit of and priority to U.S. Provisional Patent Application No. 63/439,614 filed on Jan. 18, 2023, the content of which application is incorporated herein by reference as if fully set forth.

FIELD

The present disclosure relates generally to interrogation, detection, and location systems for radio-frequency (RF) ID tags, and more particularly, detection and inventory systems for potentially retained surgical items within surgical sites.

BACKGROUND

Inventory systems are used to determine whether objects associated with a surgery are present in a patient's body before completion of the surgery. Such objects may take a variety of forms. For example, the objects may take the form of instruments, for instance, scalpels, scissors, forceps, hemostats, and/or clamps. Also, for example, the objects may take the form of related accessories and/or disposable objects, for instance, surgical sponges, gauzes, and/or pads.

SUMMARY

Failure to locate an object before closing the patient may require additional surgery, and in some instances, may have unintended medical consequences. Accordingly, there is a need for a technology or system that is capable of providing both presence detection and tagged surgical item/implement identification functionality in the medical setting, as well as inventory controls of the tagged items/implements. Specifically, detecting the presence of, identifying, and maintaining inventory of tagged surgical items and materials that are used during the execution of a medical procedure. Technologies or systems exist that enable these functions both individually as well as in conjunction with each other, but the methods and packaging of the discrete solutions used are not ideal for the application. More specifically, the components attached or affixed to the items being tracked are either too large physically and present nuisances or obstacles in the execution of the procedure, or the detection and identification performance of the solution may degrade rapidly in the presence of variable and uncontrolled dielectric or conductive materials.

This disclosure relates to systems for detection of surgical objects and/or devices used in body cavities during surgery, specifically systems that include an antenna to be inserted directly on top of or over a surgical site to detect such surgical objects and/or devices.

In accordance with aspects of the disclosure, an inventory system configured for detecting and counting surgical items includes an RFID tag affixed to a surgical item, a plurality of RFID transceivers, a processor, and a memory. The RFID tag is configured to transmit a return signal when energized. The plurality of RFID transceivers is configured to generate an energizing signal for the RFID tag and to receive the return signal transmitted by the RFID tag.

The memory stores instructions which, when executed by the processor, cause the system to: energize the RFID tag by a first energizing signal; receive a first return signal from the RFID tag by the plurality of RFID transceivers; determine an initial position of the surgical item based on the first return signal by triangulation; energize the RFID tag by a second energizing signal; receive a second return signal from the RFID tag by the plurality of RFID transceivers; determine a last known position of the surgical item and a velocity and/or a direction of the RFID tag based on the second return signal by triangulation; determine a difference between the last known position of the RFID tag and the initial position of the RFID tag; and determine whether the surgical item has either been inserted into a surgical site or has been removed from the surgical site based on the determined difference and the velocity and/or direction of the RFID tag.

In an aspect of the present disclosure, the instructions, when executed by the processor, may further cause the system to determine an identifier of the surgical item based on the first return signal and/or the second return signal.

In another aspect of the present disclosure, the instructions, when executed by the processor, may further cause the system to provide a count based on the identifier and the determination of whether the surgical item has either been inserted into the surgical site or has been removed from the surgical site based on the determined difference and the velocity and/or direction of the RFID tag.

In yet another aspect of the present disclosure, the system may further include a signal generator, wherein the signal generator includes an indicator configured to indicate if the surgical item is removed from the surgical site.

In a further aspect of the present disclosure, the instructions, when executed by the processor, may further cause the system to provide the indication via the indicator of the signal generator.

In yet a further aspect of the present disclosure, the instructions, when executed by the processor, may further cause the system to determine that no surgical items remain in the surgical site based on the count and provide an all-clear indication based on the determination.

In an aspect of the present disclosure, the instructions, when executed by the processor, may further cause the system to determine that one or more surgical items remain in the surgical site based on the count and provide an indication that the one or more items remain in the surgical site based on the determination.

In yet another aspect of the present disclosure, the first return signal and/or the second return signal may include an ID name and/or an ID number. Prior to the surgical item entering a surgical site, the instructions, when executed by the processor, may further cause the system to read the at least one of the ID name or the ID number from at least one of the first return signal or the second return signal and store the at least one of the ID name or the ID number in the memory.

In a further aspect of the present disclosure, when the surgical item is removed from the surgical site, the instructions, when executed by the processor, may further cause the system to read the at least one of the ID name or the ID number from the return signal and compare the at least one of the ID name or the ID number to the stored at least one of the ID name or the ID number in memory.

In yet a further aspect of the present disclosure, the instructions, when executed by the processor, may further cause the system to provide an indication that the surgical item has either been inserted into the surgical site or is removed from the surgical site, based on the determination.

In accordance with aspects of the disclosure, a computer-implemented method for detecting and counting surgical items, includes: energizing an RFID tag that is affixed to a surgical item by a first energizing signal; receiving a first return signal from the RFID tag by a plurality of RFID transceivers; determining an initial position of the surgical item based on the first return signal by triangulation; energizing the RFID tag by a second energizing signal; receiving a second return signal from the RFID tag by the plurality of RFID transceivers; determining a last known position of the surgical item and a velocity and/or a direction of the RFID tag based on the second return signal by triangulation; determining a difference between the last known position of the RFID tag and the initial position of the RFID tag; and determining whether the surgical item has either been inserted into a surgical site or has been removed from the surgical site based on the determined difference and the velocity and/or direction of the RFID tag.

In an aspect of the present disclosure, the method may further include determining an identifier of the surgical item based on at least one of the first return signal or the second return signal.

In another aspect of the present disclosure, the method may further include providing a count based on the identifier and the determination of whether the surgical item has either been inserted into the surgical site or has been removed from the surgical site based on the determined difference and the velocity and/or direction of the RFID tag.

In yet another aspect of the present disclosure, the method may further include indicating that the surgical item is removed from the surgical site by an indicator of a signal generator in communication with the plurality of RFID transceivers.

In a further aspect of the present disclosure, the method may further include determining that no surgical items remain in the surgical site based on the count and providing an all-clear indication based on the determination.

In yet a further aspect of the present disclosure, the method may further include determining that one or more surgical items remain in the surgical site based on the count and providing an indication that the one or more items remain in the surgical site based on the determination.

In an aspect of the present disclosure, at least one of the first return signal or the second return signal may include an ID name, an ID number, and/or an ID symbol. Prior to the surgical item entering a surgical site, the method may further include reading the at least one of the ID name or the ID number from at least one of the first return signal or the second return signal and storing the at least one of the ID name or the ID number in memory.

In accordance with aspects of the disclosure, when the surgical item is removed from the surgical site the method may further include reading the at least one of the ID name or the ID number from the return signal and comparing the at least one of the ID name or the ID number to the stored at least one of the ID name or the ID number in memory.

In yet a further aspect of the present disclosure, the method may further include providing an indication that the surgical item has either been inserted into the surgical site or is removed from the surgical site, based on the determination.

In an aspect of the present disclosure, a non-transitory computer-readable storage medium in which is stored instructions for causing a processor to execute a computer-implemented method for detecting and counting surgical items. The method includes: energizing an RFID tag affixed to a surgical item by a first energizing signal; receiving a first return signal from the RFID tag by a plurality of RFID transceivers; determining an initial position of the surgical item based on the first return signal; energizing the RFID tag by a second energizing signal; receiving a second return signal from the RFID tag by the plurality of RFID transceivers; determining a last known position of the surgical item and a velocity and/or direction of the RFID tag based on the second return signal; determining a difference between the last known position of the RFID tag and the initial position of the RFID tag; and determining whether the surgical item has either been inserted into a surgical site or has been removed from the surgical site based on the determined difference and the velocity and/or direction of the RFID tag.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements and have been solely selected for ease of recognition in the drawings.

Various aspects of the presently disclosed antennae, RF tags, and articles containing them are described hereinbelow with reference to the drawings.

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Figure 1:
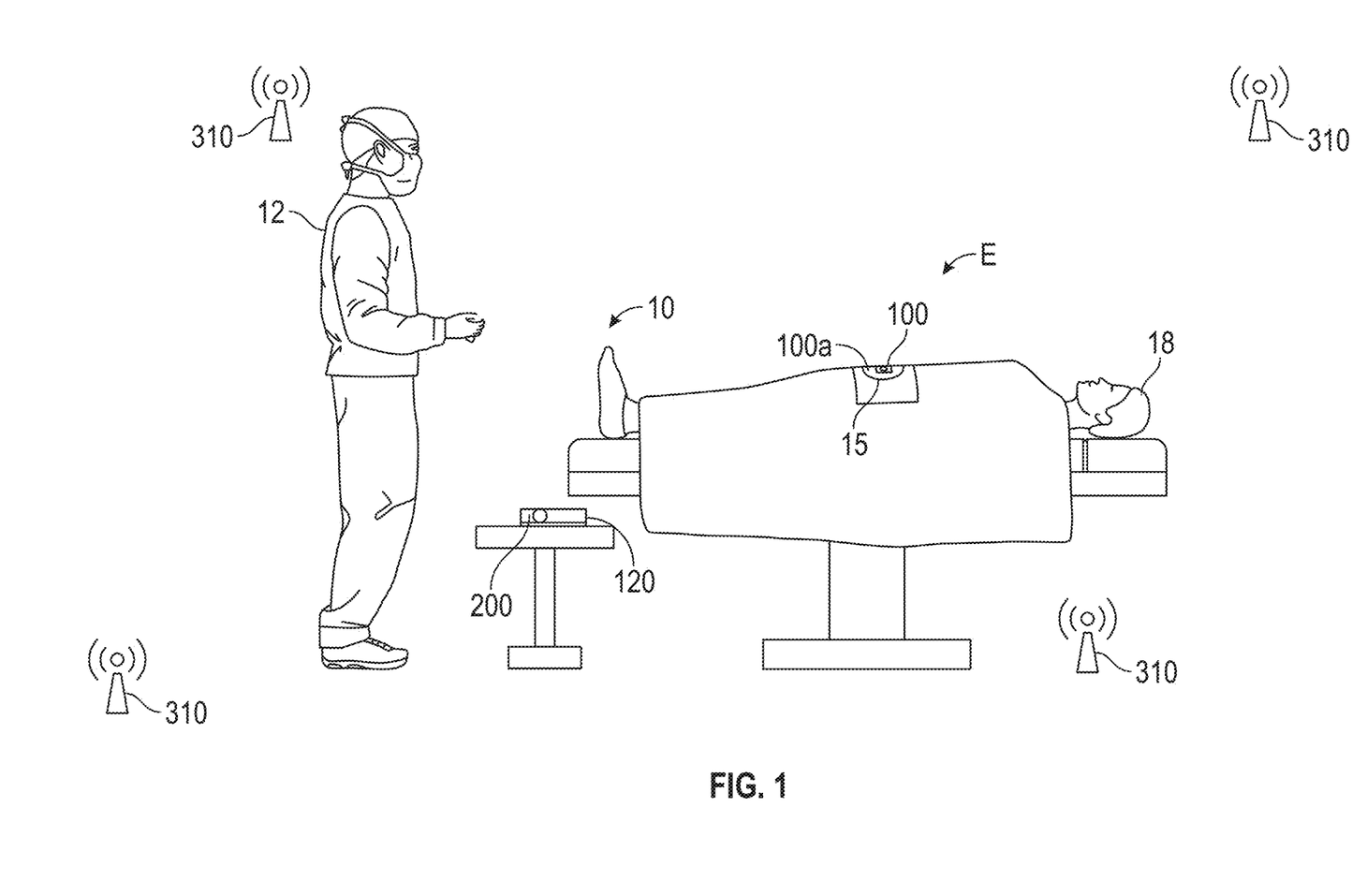
FIG. 1 is a schematic diagram showing a surgical environment illustrating a clinician using an inventory system for detecting and counting an object within a patient that is tagged with an RFID tag according to one illustrated aspect.
Figure 3:
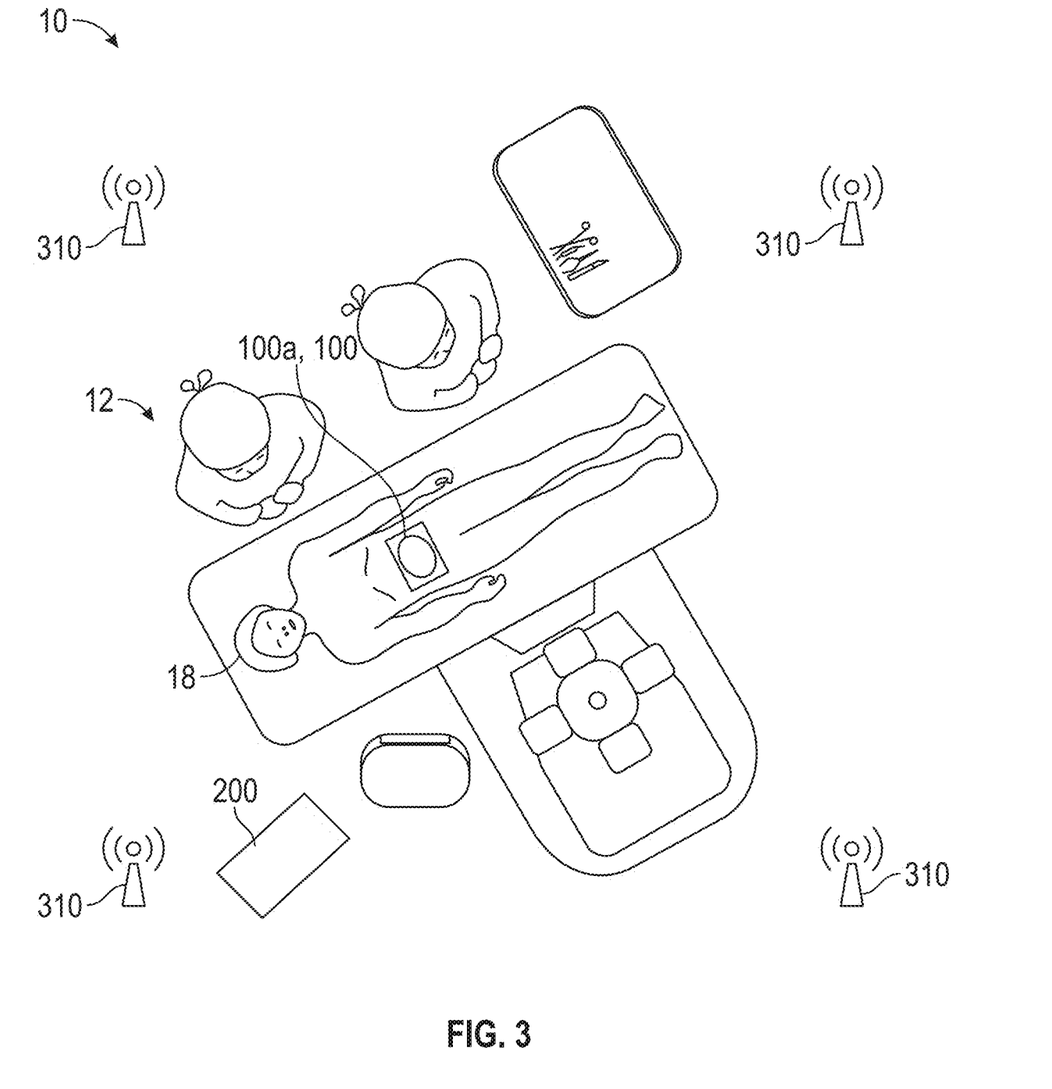
FIG. 3 is a top view of the surgical environment of FIG. 1 according to one illustrated aspect.

FIGS. 1 and 3 depict a surgical environment "E" in which a clinician 12 operates an inventory system 10 for detection and counting of radio-frequency identification (RFID) tags 100 to ascertain the presence or absence of items, implements or objects 100a in a patient 18. The inventory system 10 may include a plurality of RFID transceivers 310 configured to generate an energizing signal for the RFID tag 100 and to receive the return signal transmitted by the RFID tag 100. The plurality of RFID transceivers 310 may be disposed in various locations in the surgical environment "E". The plurality of RFID transceivers 310 are configured to enable the inventory system 10 to track the location of one or more RFID tags 100 in a surgical environment such as an operating room. The RFID transceivers 310 are configured to emit an energizing signal, (for example, a UHF signal) for energizing RFID tags 100. When energized, the RFID tag 100 will emit a return signal which the RFID transceiver 310 includes information such as the RFID tag's 100 protocol, managing organization, asset description, and/or serial number.

The inventory system 10 may use the plurality of RFID transceivers 310 to triangulate the location of the RFID tags 100 by comparing the signal strength and/or time lag of the received signal to reach each RFID transceiver 310. Although triangulation is described, other methods of locating the RFID tag 100 are contemplated.

The inventory system 10 may optionally further include a signal generator 120 and/or an antenna 110 coupled to the signal generator 120 by one or more communication paths, for example, coaxial cable 122. In one aspect of the inventory system 10, the antenna 110 may take the form of a hand-held wand. Generally, in use, the clinician 12 may position the wand proximate the patient 18 in order to detect the presence or absence of the one or more RFID tags 100 and hence an object 100a. The clinician 12 may in some aspects, move the wand 110a along and/or across the body of the patient 18. For a detailed description of an exemplary inventory system, reference may be made to commonly owned U.S. Patent Application Publication No. 2004/0250819, the entire content of which is hereby incorporated by reference herein.

The object 100a may take a variety of forms, for example, instruments, accessories, and/or disposable objects useful in performing surgical procedures. For instance, the object 100a may take the form of scalpels, scissors, forceps, hemostats, and/or clamps. Also, for example, the objects 100a may take the form of surgical sponges, gauze, and/or padding. The object 100a is tagged, carrying, attached, or otherwise coupled to an RFID tag 100. Aspects of the inventory system 10 disclosed herein are particularly suited to operate with one or more RFID tags 100, which are not accurately tuned to a chosen or selected resonant frequency. Consequently, the RFID tags 100 do not require high manufacturing tolerances or expensive materials and thus may be inexpensive to manufacture.

Figure 2:
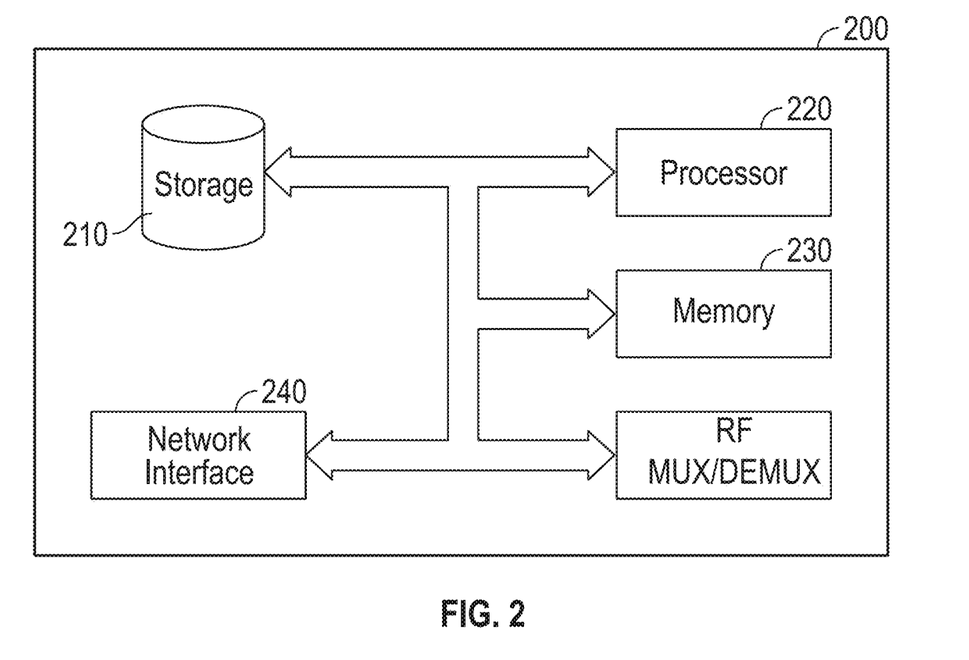
FIG. 2 is a block diagram of a controller of the system of FIG. 1 according to one illustrated aspect.

FIG. 2 illustrates that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

Figure 4:
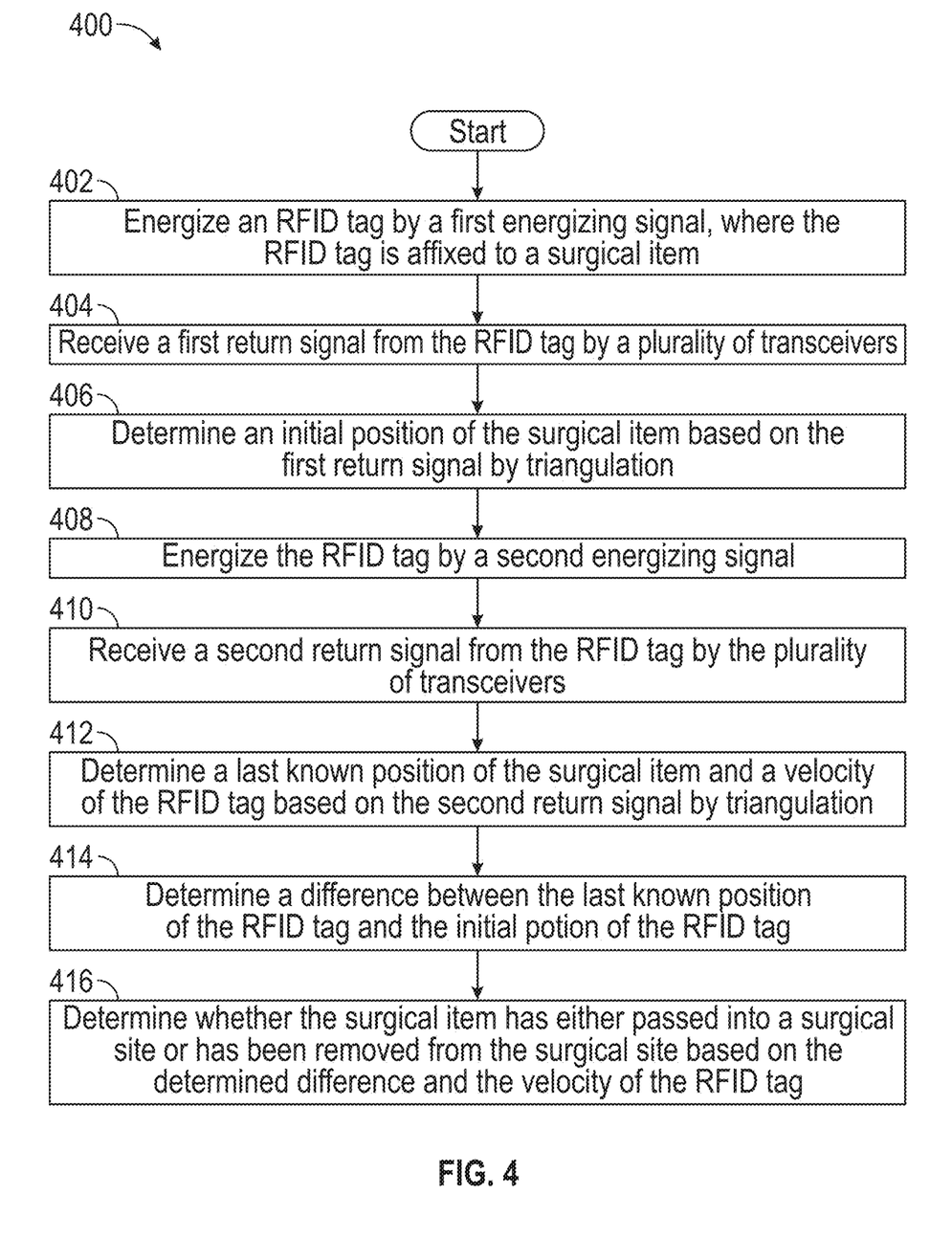
FIG. 4 is a flow chart of a computer-controlled method for detecting and counting potentially retained surgical items using the system of FIG. 1 according to one illustrated aspect.

Referring to FIG. 4, there is shown a flow chart of an exemplary computer-implemented method 400 for detecting and counting surgical items within surgical sites 15 (FIG. 1) in accordance with aspects of the present disclosure. Although the steps of FIG. 4 are shown in a particular order, the steps need not all be performed in the specified order, and certain steps can be performed in another order. For simplicity, FIG. 4 will be described below, with the controller 200 performing the operations. However, in various aspects, the operations of FIG. 4 may be performed in part by the controller 200 of FIG. 2 and in part by another device, such as a remote server. These variations are contemplated to be within the scope of the present disclosure.

An RFID tag 100 may be attached to an object 100a (e.g., a surgical item such as a surgical sponge) for tracking in a surgical environment "E" such as an operating room. As mentioned above, the surgical environment "E" may include a plurality of RFID transceivers 310 configured to generate an energizing signal and receive a return signal from the RFID tag 100.

Initially, at step 402, the controller 200 causes the inventory system 10 to energize the RFID tag 100 of object 100a by a first energizing signal. The first energizing signal is transmitted by one or more of the plurality of RFID transceivers 310. For example, the energizing signal may be in the 900 MHz to 928 MHz range.

Next, at step 404, the controller 200 causes the inventory system 10 to receive a first return signal from the RFID tag 100 of object 100a by the plurality of RFID transceivers 310. The return signal may include the RFID tag's 100 protocol, the ID name, the ID number, and/or the ID symbol (e.g., a QR code).

Next, at step 406, the controller 200 causes the inventory system 10 to determine an initial position of the object 100a based on the first return signal. For example, the initial position for the RFID tag 100 of object 100a may be on a table in the operating room. The initial position may be determined based on triangulation. The disclosed technology enables the tracking of an RFID tagged object 100a entering a surgical environment and to determine what the object 100a is and the direction of movement of the object 100a, as it moves about the surgical environment.

In aspects, the controller 200 causes the inventory system 10 to calculate multiple aspects of the movement dynamics of the object 100a. This includes not only position but also the direction the object 100a is moving. The controller 200 causes the inventory system 10 to generate a probability of where the object 100a is going. For example, like a Kalman filter used for inertial motion, the controller 200 creates a model of the object's 100a movement that is corrected by observations. This enables the inventory system 10 to predict with good accuracy what is likely to be happening when there is no actual data. The RFID tag 100 are likely to appear and disappear because they are obscured by things in and around the surgical site 15. Creating this model enables the inventory system 10 to determine with high confidence that the object 100a is in the surgical site 15 even if it is not directly "seen."

Next, at step 408, the controller 200 causes the inventory system 10 to energize the RFID tag 100 of object 100a by a second energizing signal. Next, at step 410, the controller 200 causes the inventory system 10 to receive a second return signal from the RFID tag 100 of object 100a by the plurality of RFID transceivers 310. For example, at a later time, a clinician 12 may take the surgical sponge and approach a surgical site 15. As the clinician 12 approaches the surgical site 15, the RFID tag 100 of object 100a may be energized a second time and the plurality of RFID transceivers 310 may receive a return signal from the RFID tag 100 of object 100a. As the object 100a and the affixed RFID tag 100 pass into the surgical site 15, tissue and fluids of the patient may obstruct the energizing signal and/or the RFID return signal.

In aspects, the controller 200 causes the inventory system 10 to determine an identifier of the object 100a based on the return signal. For example, the identifier may include an ID name or and ID number such as a serial number and/or a model number of the object 100a.

Next, at step 412, the controller 200 causes the inventory system 10 to determine a last known position of the RFID tag 100 of the object 100a based on the second return signal by triangulation. The controller 200 may further cause the inventory system 10 to determine a velocity, speed, and/or a direction of the RFID tag 100 of the object 100a. The inventory system 10, for example, may determine that the last known position of the RFID tag 100 of object 100a was just outside of the surgical site 15. Thus, when the object 100a is inserted inside the patient, the dielectric of the tissue and fluid of the patient may render the RFID tag 100 of object 100a unreadable to the RFID transceivers 310. As the last position of the RFID tag 100 of object 100a is known (e.g., next to the patient 18), the velocity and/or direction of the RFID tag 100 of object 100a is known (e.g., heading toward the patient 18), it can be concluded with a high degree of certainty that the object 100a is now in the patient. This is registered in the memory of the inventory system 10 as an object that is at risk of being left in the patient.

In aspects, the controller 200 causes the inventory system 10 to determine a last known position of the RFID tag 100 of the object 100a based on the model generated in step 406.

Next, at step 414, the controller 200 causes the inventory system 10 to determine a difference between the last known position of the RFID tag 100 of object 100a and the initial position of the RFID tag. Next, at step 416, the controller 200 causes the inventory system 10 to determine whether the object 100a has either been inserted into the surgical site 15 or has been removed from the surgical site 15 based on the determined difference and the velocity and/or direction of the RFID tag. For example, the inventory system 10 may determine that object 100a has been inserted into the surgical site 15 since the initial position was at a table and the last known position was just outside of the surgical site 15.

When the object 100a is removed from the patient, the RFID tag 100 of object 100a will now be readable by the antenna 110. The position of the RFID tag 100 of object 100a is known (e.g., near the patient 18) and the velocity and/or direction of the RFID tag 100 of object 100a is known (e.g., moving away from the patient) so this object 100a can be removed from the "at risk" list.

In aspects, the controller 200 causes the inventory system 10 to provide a count based on the determination of whether the object 100a has either been inserted into the surgical site 15 or has been removed from the surgical site 15 based on the determined difference and the velocity and/or direction of the RFID tag 100 of object 100a. In aspects, inventory system 10 may additionally use the identifier to provide the count. The count may be displayed on a user device, and/or a display of the inventory system 10. Thus, the disclosed technology provides the benefit of automated counting of objects 100a used in procedures.

In aspects, the signal generator 120 may include an indicator configured to indicate if the object 100a is removed from the surgical site. Realtime feedback can be provided to the clinical staff as to the status of the at risk list, for example, more than zero items equals a red indicator, zero items equals a green indicator. In this manner, the disclosed technology provides the benefit of giving the clinical staff the answer to the question of "is there anything left in the patient?"

In aspects, the controller 200 may cause the inventory system 10 upon determining that no surgical items remain in the surgical site, provide an all-clear indication.

While several aspects of the disclosure have been shown in the drawings and/or described herein, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope of the claims appended hereto.

What is claimed is:

1. An inventory system configured for detecting and counting surgical items, the inventory system comprising:
    an RFID tag affixed to a surgical item, the RFID tag configured to transmit return signals when energized, wherein the return signals include a first return signal and a second return signal;
    a plurality of RFID transceivers configured to generate energizing signals for the RFID tag and to receive the first return signal transmitted by the RFID tag;
    a processor; and
    a memory storing instructions which, when executed by the processor, cause the system to:
        energize the RFID tag by a first energizing signal;
        receive the first return signal from the RFID tag by the plurality of RFID transceivers;
        determine an initial position of the surgical item based on the first return signal by triangulation;
        energize the RFID tag by a second energizing signal;
        receive a second return signal from the RFID tag by the plurality of RFID transceivers;
        determine a last known position of the surgical item and at least one of a velocity or a direction of the RFID tag based on the second return signal by triangulation;
        determine a difference between the last known position of the RFID tag and the initial position of the RFID tag; and
        determine whether the surgical item has either been inserted into a surgical site or has been removed from the surgical site based on the determined difference and the at least one of the velocity or the direction of the RFID tag.

2. The system of claim 1, wherein the instructions, when executed by the processor, further cause the system to:
    determine that no surgical items remain in the surgical site based on a count; and
    provide an all-clear indication based on the determination.

3. The system of claim 1, wherein the instructions, when executed by the processor, further cause the system to:
   determine that one or more surgical items remain in the surgical site based on a count; and
   provide an indication that the one or more items remain in the surgical site based on the determination.

4. The system of claim 1, wherein the instructions, when executed by the processor, further cause the system to:
   provide an indication that the surgical item has either been inserted into the surgical site or is removed from the surgical site, based on the determination.

5. The system of claim 1, wherein the instructions, when executed by the processor, further cause the system to:
   determine an identifier of the surgical item based on at least one of the first return signal or the second return signal.

6. The system of claim 5, wherein the instructions, when executed by the processor, further cause the system to:
   provide a count based on the identifier and the determination of whether the surgical item has either been inserted into the surgical site or has been removed from the surgical site based on the determined difference and the at least one of the velocity or the direction of the RFID tag.

7. The system of claim 6, further including a signal generator, wherein the signal generator includes an indicator configured to indicate if the surgical item is removed from the surgical site.

8. The system of claim 7, wherein the instructions, when executed by the processor, further cause the system to:
   provide the indication via the indicator of the signal generator.

9. The system of claim 1, wherein at least one of the first return signal or the second return signal includes at least one of an ID name, an ID number, or an ID symbol, and
   wherein prior to the surgical item entering the surgical site, the instructions, when executed by the processor, further cause the system to:
      read the at least one of the ID name, the ID number, or the ID symbol from at least one of the first return signal or the second return signal; and
      store the at least one of the ID name, the ID number, or the ID symbol in the memory.

10. The system of claim 9, wherein when the surgical item is removed from the surgical site, the instructions, when executed by the processor, further cause the system to:
    read the at least one of the ID name, the ID number, or the ID symbol from the at least one of the first return signal or the second return signal; and
    compare the at least one of the ID name, the ID number, or the ID symbol to the stored at least one of the ID name, the ID number, or the ID symbol in memory.

11. A computer-implemented method for detecting and counting surgical items, comprises:
    energizing an RFID tag by a first energizing signal, wherein the RFID tag affixed to a surgical item;
    receiving a first return signal from the RFID tag by a plurality of RFID transceivers;
    determining an initial position of the surgical item based on the first return signal by triangulation;
    energizing the RFID tag by a second energizing signal;
    receiving a second return signal from the RFID tag by the plurality of RFID transceivers;
    determining a last known position of the surgical item and at least one of a velocity or a direction of the RFID tag based on the second return signal by triangulation;
    determining a difference between the last known position of the RFID tag and the initial position of the RFID tag; and
    determining whether the surgical item has either been inserted into a surgical site or has been removed from the surgical site based on the determined difference and the at least one of the velocity or the direction of the RFID tag.

12. The computer-implemented method of claim 11, further comprising:
    determining that no surgical item remain in the surgical site based on a count; and providing an all-clear indication based on the determination.

13. The computer-implemented method of claim 11, further comprising:
    determining that one or more surgical items remain in the surgical site based on a count; and
    providing an indication that the one or more items remain in the surgical site based on the determination.

14. The computer-implemented method of claim 11, further comprising:
    determining an identifier of the surgical item based on at least one of the first return signal or the second return signal.

15. The computer-implemented method of claim 14, further comprising:
    providing a count based on the identifier and the determination of whether the surgical item has either been inserted into the surgical site or has been removed from the surgical site based on the determined difference and the at least one of the velocity or the direction of the RFID tag.

16. The computer-implemented method of claim 15, further comprising:
    indicating that the surgical item is removed from the surgical site by an indicator of a signal generator in communication with the plurality of RFID transceivers.

17. The computer-implemented method of claim 11, wherein at least one of the first return signal or the second return signal includes at least one of an ID name or an ID number, and wherein prior to the surgical item entering the surgical site, the method further comprises:
    reading the at least one of the ID name or the ID number from at least one of the first return signal or the second return signal; and
    storing the at least one of the ID name or the ID number in memory.

18. The computer-implemented method of claim 17, wherein when the surgical item is removed from the surgical site the method further comprises:
    reading the at least one of the ID name or the ID number from the at least one of the first return signal or the second return signal; and
    comparing the at least one of the ID name or the ID number to the stored at least one of the ID name or the ID number in memory.

19. The computer-implemented method of claim 18, further comprising providing an indication that the surgical item has either been inserted into the surgical site or is removed from the surgical site, based on the determination.

20. A non-transitory computer-readable storage medium in which is stored instructions for causing a processor to execute a computer-implemented method for detecting and counting surgical items, the method comprising:
    energizing an RFID tag by a first energizing signal, wherein the RFID tag affixed to a surgical item;

receiving a first return signal from the RFID tag by a plurality of RFID transceivers;

determining an initial position of the surgical item based on the first return signal;

energizing the RFID tag by a second energizing signal;

receiving a second return signal from the RFID tag by the plurality of RFID transceivers;

determining a last known position of the surgical item and at least one of a velocity or a direction of the RFID tag based on the second return signal;

determining a difference between the last known position of the RFID tag and the initial position of the RFID tag; and determining whether the surgical item has either been inserted into a surgical site or has been removed from the surgical site based on the determined difference and the at least one of the velocity or the direction of the RFID tag.

* * * * *